United States Patent
Stuart, Jr. et al.

(10) Patent No.: US 6,187,870 B1
(45) Date of Patent: Feb. 13, 2001

(54) APPARATUS AND PROCESS FOR THE PRODUCTION OF LOW MOLECULAR WEIGHT GRAFTED POLYOLEFINS

(75) Inventors: Richard K. Stuart, Jr.; Randal R. Ford, both of Longview, TX (US)

(73) Assignee: Eastman Chemical Company, Kingsport, TN (US)

(*) Notice: Under 35 U.S.C. 154(b), the term of this patent shall be extended for 0 days.

(21) Appl. No.: 08/168,549

(22) Filed: Dec. 16, 1993

(51) Int. Cl.⁷ ................................................. C08F 267/04
(52) U.S. Cl. ......................... 525/285; 525/301; 525/308; 525/309
(58) Field of Search ..................... 525/285, 301, 525/308, 309

(56) References Cited

U.S. PATENT DOCUMENTS

| | | |
|---|---|---|
| 3,414,551 | 12/1968 | Reid et al. . |
| 3,480,580 | 11/1969 | Joyner et al. . |
| 3,481,910 | 12/1969 | Brunson et al. . |
| 3,642,722 | 2/1972 | Knowles et al. . |
| 3,742,093 * | 6/1973 | Skidmore ............................... 260/893 |
| 3,746,676 | 7/1973 | Joyner et al. . |
| 3,932,368 | 1/1976 | McConnell et al. . |
| 4,026,967 | 5/1977 | Flexman et al. . |
| 4,028,436 | 6/1977 | Bogan et al. . |
| 4,031,062 | 6/1977 | Shirayama et al. . |
| 4,071,494 | 1/1978 | Gaylord . |
| 4,218,263 | 8/1980 | Kawabata et al. . |
| 4,315,863 | 2/1982 | Tomoshige et al. . |
| 4,347,341 | 8/1982 | Bartl et al. . |
| 4,358,564 | 11/1982 | Ames . |
| 4,376,855 | 3/1983 | Ames . |
| 4,506,056 | 3/1985 | Gaylord . |
| 4,613,679 | 9/1986 | Mainord . |
| 4,632,962 | 12/1986 | Gallucci . |
| 4,639,495 | 1/1987 | Waggoner . |
| 4,670,515 * | 6/1987 | Olivier ................................. 525/285 |
| 4,719,260 * | 1/1988 | Stuart, Jr. et al. ..................... 525/74 |
| 4,762,890 | 8/1988 | Strait et al. . |
| 4,780,228 | 10/1988 | Gardiner et al. . |
| 4,987,190 | 1/1991 | Keogh . |
| 5,032,459 * | 7/1991 | Toyoshima et al. .................. 525/285 |
| 5,137,975 * | 8/1992 | Kelusky ................................ 525/285 |

* cited by examiner

*Primary Examiner*—David W. Wu
(74) *Attorney, Agent, or Firm*—B. J. Boshears; Harry J. Gwinnell

(57) ABSTRACT

Disclosed is a process for the production of low molecular weight grafted polyolefins in which a molten polyolefin is grafted by reactive processing in a screw extruder at an elevated pressure. The molten polyolefin has a low viscosity and flows easily around the screw, thus the pressure is maintained in the screw extruder apparatus by the use of a pressure control device at the exit end of the extruder.

1 Claim, 1 Drawing Sheet

APPARATUS AND PROCESS FOR THE PRODUCTION OF LOW MOLECULAR WEIGHT GRAFTED POLYOLEFINS

FIELD OF THE INVENTION

The present invention relates to the production of low molecular weight, low viscosity grafted polyolefins by reactive processing in a screw extruder. The present invention also relates to a screw extruder having a chamber or barrel that is capable of maintaining an elevated pressure while extruding a low viscosity material.

BACKGROUND OF THE INVENTION

Grafting of high and low molecular weight polymers has been reported often in the literature, see for example, the polymer text book "Polymer Chemistry" by M. P. Stevens (Addison-Wesley), 1975, PP196–202. Maleation is one type of grafting. For example, maleation of polypropylenes progresses easily to higher acid numbers with free radical initiation (see U.S. Pat. Nos. 3,414,551, 3,480,580, 3,481,910, 3,642,722, 3,746,676, 3,932,368 and 4,613,679). The molecular weight of the products of such reactions are lower than that of the starting polypropylene due to accompanying degradation reactions. On the other hand, direct maleation of polyethylenes results in cross-linking which increases the molecular weight of the polymer, see for example, "Journal of Applied Polymer Science", 44, 1941, N. G. Gaylord et al (1992); and U.S. Pat. Nos. 4,026,967, 4,028,436, 4,031,062, 4,071,494, 4,218,263, 4,315,863, 4,347,341, 4,358,564, 4,376,855, 4,506,056, 4,632,962, 4,780,228, 4,987,190, and 5,021,510]. Free radical initiated maleation of polypropylenes and polyethylenes in continuous processes is limited to very low levels of grafting and low acid numbers such as below 4 percent grafting. Grafted polyolefins are very suitable for use as compatibilizing agents and adhesion promoters between polymers and fillers. An increased acid number and percent grafting of the polyolefins would provide polyolefins with improved properties such as substrate wetting and adhesion and would even make some polyolefins emulsifiable, rendering them useful in emulsions. However, the higher levels of grafting is difficult to achieve due to the flashing of some of the components and/or crosslinking of the polyolefin in the extruder.

U.S. Pat. No. 4,762,890 discloses the grafting of polymers in a twin screw extruder. This technique is effective for high molecular weight polymers; however, the grafting is only up to 2 weight percent. U.S. Pat. No. 4,639,495 discloses the grafting using peroxide initiators however, the percent grafting is only obtainable up to 3 weight percent.

Efficiently grafting high amounts of comonomer onto polyolefins, producing higher acid numbers, have been attempted but only in batch processes with less than perfect results. Conversion of the batchwise process to a commercial continuous extruder based process has not, heretofore, been practical. However, for a polyolefin grafting process to be commercial and cost effective the process should be continuous. It would, therefore, be very desirable to be able to continuously and efficiently produce highly grafted polyolefins of high acid number.

SUMMARY OF THE INVENTION

The process for the production of low molecular weight grafted polyolefins comprises:

(a) mixing, at an elevated temperature of about 160 to 300° C., in an extruder equipped with an outlet pressure control device about 0.1 to 20 weight percent of a free radical initiator, about 0.1 to 30 weight percent of an ethylenically unsaturated polycarboxylic acid, anhydride, or ester thereof, and the remainder of a polyolefin containing at least 93 weight percent C3–C10 olefins, wherein said elevated temperature is higher than the atmospheric boiling point of at least one of the components thereby producing an elevated pressure in said extruder of at least 30 psig, and (b) extruding the resulting molten grafted polyolefin having a viscosity of less than 3,000 cP at 190° C.

The apparatus according to the present invention comprises a screw extruder having a heated elongated chamber containing a screw feed means, a feed opening at the first end of said chamber, and a pressure control valve at the second end of said chamber having a means to maintain the pressure within said chamber at about 30 to 400 psig, and a means to permit molten polymer to exit the chamber, wherein said screw means operates so as to feed material from said feed opening to said pressure control valve and wherein said chamber has a plurality of injection ports along said chamber for injecting material into said chamber.

DETAILED DESCRIPTION OF THE INVENTION

Figure 1:
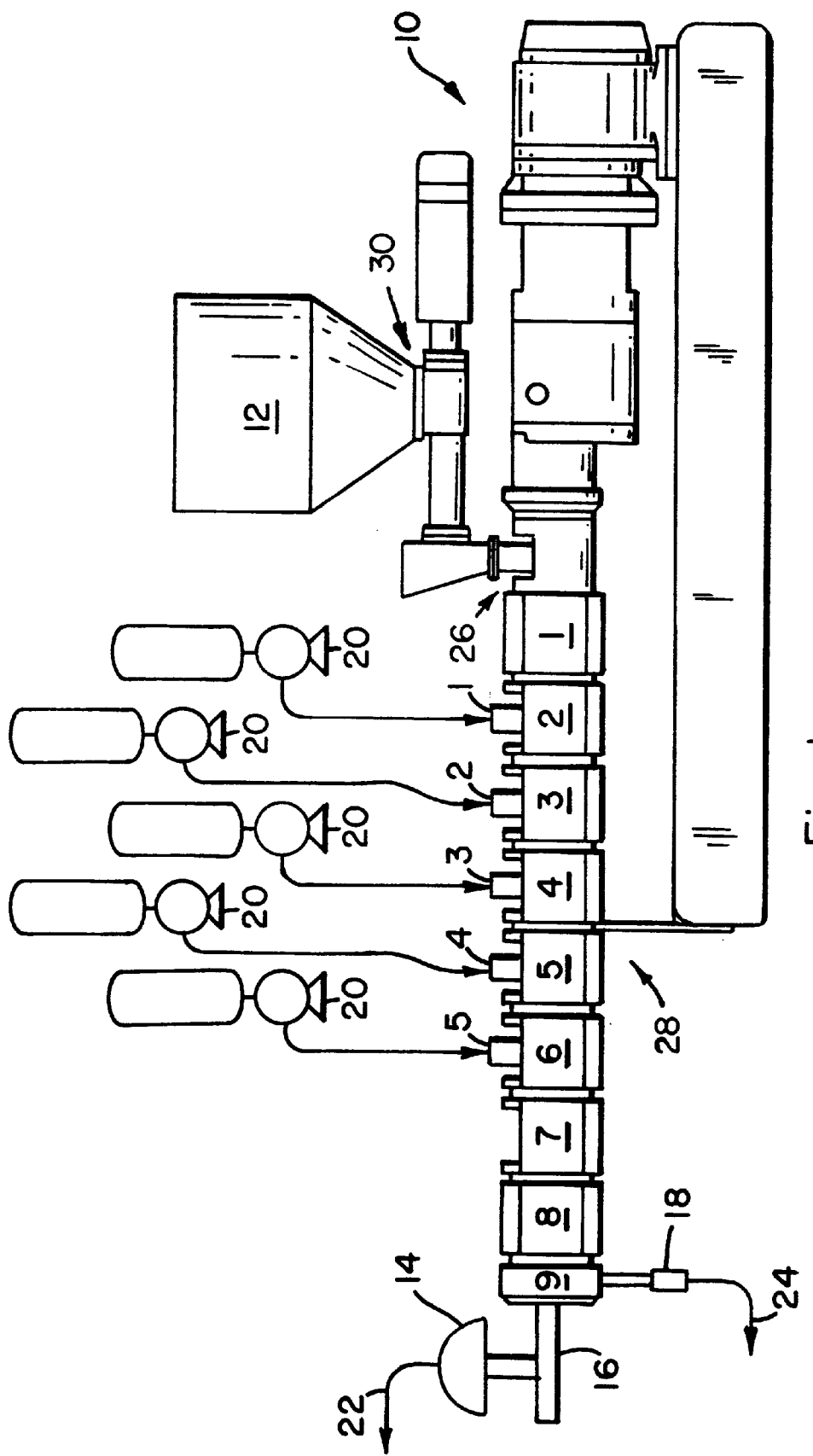
FIG. 1 illustrates a preferred screw extruder apparatus for the production at elevated pressures of low molecular weight grafted polyolefins.

The applicants have unexpectedly discovered a method of efficiently grafting monomers such as maleic anhydride onto polyolefins at high concentrations to produce high acid numbers. The present process unexpectedly produces highly grafted polyolefins by reactively processing a molten polyolefin with a comonomer in a screw extruder at elevated pressure. Prior to the present invention, producing highly grafted polyolefins of high acid number efficiently using the grafting comonomer has not been possible with low viscosity polyolefins. This is possible in the present process by using the inventive screw extruder apparatus that has a pressure control valve at the exit end of the screw chamber. These highly grafted high acid number polyolefins are very useful since higher acid numbers increase adhesion making these polyolefins more useful for coatings and compatabilizing agents. Additionally, highly grafted random ethylene/ropylene copolymers of high acid number are emulsifiable and produce stable emulsions that are useful in adhesion promotion, floor finish, and coupling aids.

The process according to the present invention for the production of low molecular weight grafted polyolefins comprises:

(a) mixing, at an elevated temperature of about 160 to 300° C., in an extruder equipped with an outlet pressure control device about 0.1 to 20 weight percent of a free radical initiator, about 0.1 to 30 weight percent of an ethylenically unsaturated polycarboxylic acid, anhydride, or ester thereof, and the remainder of a polyolefin containing at least 93 weight percent C3–C10 olefins, wherein said elevated temperature is higher than the atmospheric boiling point of at least one of the components thereby producing an elevated pressure in said extruder of about 30 to 400 psig, and (b) extruding the resulting molten grafted polyolefin having a viscosity of less than 3,000 cP at 190° C.

This process is preferably conducted in a screw extruder as illustrated in FIG. 1, more preferably a twinscrew extruder. Injection ports 1, 2, 3, 4, and 5 are located along the barrel or chamber 28 of screw extruder 10. Feed hopper/feed apparatus 12, feeds particulate polyolefin via a calibrated conveying means 30 into screw extruder 10 to a throat or feed opening 26 at a first end of the chamber 28. The polyolefin then proceeds in the molten state through zone 1, 2, 3, 4, 5, 6, 7, 8, and 9 out of die opening 16 past the pressure control valve 14 out of the second end of chamber 28. The ethylenically unsaturated carboxylic acid, anhydride or ester thereof, such as maleic anhydride, is pumped into and through one or more of the injection ports 1, 2, 3, 4, or 5 into the zones of the chamber 28 by reagent injection pumps 20. In this same manner, the free radical initiator, usually peroxide such as ditertiary butyl peroxide, is fed through one or more of the injection ports in a 50/50 solution of peroxide to hydrocarbon solvent by reagent injection pumps 20. In the examples the amount of the hydrocarbon solvent is not counted when calculating the amount of peroxide. The elevated pressure of 30 to 400 psig is maintained in the chamber 28 of the extruder 10 by means of the pressure control valve 14 that is actuated by the current to pneumatic (IP) converter (not shown) by measuring the pressure within zone 9 with the pressure transducer 18 with connection 24 to a pressure indicator. The pressure is controlled by a standard controller.

Another key element of this preferred process and apparatus of the present invention is the use of reverse kneading blocks in the screw extruder apparatus (not shown) close to the throat or feed opening of the extruder. These kneading blocks serve as a physical barrier to the pressured extruder additives (eg volatile solvent, peroxide, or maleic anhydride). These kneading blocks prevent the volatile reactants from entering the throat of the extruder. The reverse kneading blocks appear to be more effective that reverse conveying elements at forming a barrier for the pressured volatile reactants. Since resin grade polyolefins are used as feeds, the viscosity of the melt stream is sufficient for the reverse kneading blocks to adequately prevent the blow by of the reactants out of the feed throat.

The process according to the present invention is conducted at an elevated temperature of about 160 to 300° C. This elevated temperature is preferably about 170 to 280° C., more preferably about 170 to 250° C., with an elevated temperature of about 175 to 230° C. being most preferred. At temperatures much below 160° C. the polymer is too resistant to flow. At much above 300° C. most peroxide half lives are too short to be useful.

In the process according to the present invention the free radical initiator is preferably a peroxide, more preferably a dialkyl peroxide. Suitable examples of dialkyl peroxides include ditertiary butyl peroxide, tertiary butyl hydroperoxide, cumene hydroperoxide, p-methane peroxide, 2,5-dimethyl-2,5-ditertiary butyl peroxyhexene, and p-methane hydroperoxide with ditertiary butyl peroxide being most preferred. The peroxides are generally more preferred, particularly ditertiary butyl peroxide due to availability and superior performance.

In the process according to the present invention the amount of free radical initiator is about 0.1 to 20 weight percent, preferably about 1 to 20 weight percent, more preferably about 5 to 15 weight percent, with a weight percent of free radical initiator of about 1 to 14 weight percent being most preferred. Amounts much below 0.1 weight percent free radical initiator are not sufficient to activate the graft monomer to induce grafting of the polyolefin. Amounts much above 20 weight percent free radical initiator are simply excess and tend to degrade the polyolefin excessively.

In the process according to the present invention the ethylenically unsaturated polycarboxylic acid, anhydride, or esters thereof is present in a concentration of about 0.1 to 30 weight percent, preferably about 1 to 25 weight percent, more preferably about 5 to 25 weight percent, with a weight percent of about 7 to 20 being most preferred. As with the free radical initiator, the ethylenically unsaturated polycarboxylic acid, anhydride or ester thereof should not be much below 0.1 weight percent otherwise sufficient grafting of the polyolefin is not obtained. Amounts much above 30 weight percent are excess and do not significantly increase the performance properties of the products.

Examples of suitable ethylenically unsaturated polycarboxylic acid, anhydride or esters include the acid, anhydride or esters of the group consisting of maleic, citraconic, fumaric, 2-methylmaleic, 2-chloromaleic, 2-methoxycarbonylmaleic, 2,3-dimethylmaleic, and 2,3dichloromaleic, with maleic anhydride being most preferred.

The amount of polyolefin present in the present invention is the amount that remains after the other components are calculated but is preferably about 70 to 98 weight percent, more preferably about 70 to 95 weight percent, with a weight percent of about 75 to 90 being most preferred. At concentrations much below 70 weight percent polyolefin the grafting is not as efficient, whereas at concentrations much above 98 weight percent there is not sufficient free radical initiator or grafting comonomer to significantly graft the polyolefin.

The polyolefin according to the present invention contains at least 93 weight percent of a $C_3$ to $C_{10}$ olefin, preferably at least 95 weight percent, more preferably 100 weight percent. The polyolefin contains 0 up to less than 7 weight percent ethylene. At higher amounts of ethylene the process does not function well since crosslinking and plugging of the screw may occur. A particularly preferred polyolefin is an ethylene/propylene random copolymer containing at least about 0.5 to less than 7 weight percent ethylene, preferably 0.8 to 6.5 weight percent, more preferably 1 to 6, with a weight percent of ethylene of about 2 to 6 being most preferred. This process and the ethylene propylene copolymer are disclosed and claimed in the copending application filed the same date herewith identified as attorney docket number 68081. Examples of other suitable polyolefins include polybutene, polyhexene, ethylene propylene copolymers, propylene,butene copolymers and polypropylene. A polypropylene is a more preferred polyolefin with a homopolypropylene being alternatively preferred.

The elevated pressure maintained in the extruder by way of the pressure control valve and feed back mechanism is maintained at a pressure of at least 30 psig, preferably 30 to 400 psig, more preferably 50 to 400 psig, even more preferably 75 to 200 psig with a pressure of about 100 to 175 psig being most preferred. At pressures much below 30 psig too much of the reactants blow past the pressure control device or valve out the die and are not maintained in the chamber with the polyolefin to react to a significant extent at high efficiencies. At pressures much above 400 psig and sometimes 200 psig, depending upon kneading block temperature and polymer type, volatile reactants back up in the throat. With the judicious choice of kneading block temperature and configuration this can be avoided.

The resulting molten grafted polyolefin is a low viscosity polyolefin having a viscosity of less than 3,000 cP at 190° C. as it exits the chamber thru the die of the extruder. It is this low viscosity polyolefin that requires the pressure control valve and pressure control mechanism to maintain the reactants in the extruder. This apparatus and process is very useful for highly grafting polyolefins to high acid number polymers that have low viscosities. The molten grafted polyolefin preferably has a viscosity less than 2,000 cP at 190° C., more preferably less than 1,000 cP at 190° C. with a viscosity of less than 600 cP at 190° C. being most preferred.

The process according to the present invention produces a grafted polyolefin having greater than 5 weight percent comonomer grafted thereon and an acid number that is relatively high, higher than 28. The amount of grafted comonomer is preferably greater than 7 weight percent, with a weight percent of grafted comonomer of greater than 10 being most preferred. The acid number also corresponds to the amount of grafting, 5 weight percent equaling an acid number of about 28. The higher the amount of grafting and the higher acid numbers are more preferred, thus, an acid number greater than 35 is more preferred, with an acid number greater than 44 being most preferred. Low acid numbers and low grafting percent of comonomer below what is stated is less preferred in that the desirable properties of adhesion, compatabilizing and emulsifiability are reduced. The upper amounts of grafting and acid number can be as high as practical and are only limited by the capacity of the extruder.

The examples are intended to illustrate the present invention, without intended limitation of the scope.

Examples

Comparative Example 1

Crystalline polypropylene with a 12 melt flow rate, available as Tenite P4-011 from Eastman Chemical (Eastman), was fed to a 43 L/D 25 mm co-rotating twin-screw extruder (see FIG. 1) at the rate of 10 pounds/hour. Ditertiary butyl peroxide was fed into zones 2, 3, 4 and 6 at the rate of 0.5, 1.5, 1.0 and 5.3 parts per hundred (pph). Molten maleic anhydride was fed into zone 5 at the rate of 10 pph. The temperature of zone 1 was 240° C. while all the other zones were 230° C. The pressure control device was not used and the back pressure was thus less than 30 psig. The product had a viscosity at 190° C. of 500 cP and an acid number of 22.1. This is a 48 percent conversion of maleic anhydride.

Comparative Example 2

The same crystalline polypropylene of Example 1 was fed to a 43 L/D 25 mm co-rotating twin-screw extruder (see FIG. 1) at the rate of 10 pounds/hour. itertiarybutyl peroxide was fed into zones 2, 3, 4, and 6 at the rate of 0.5, 1.5, 1.0 and 5.3 pph. Molten maleic anhydride was fed into zone 5 at the rate of 10 pph. The temperature of zone 1 was 240° C., the temperature of zone 2 was 230° C. and the temperature of zone 3 was 220° C. The temperature of the other zones was 200° C. The pressure control device was not used and the back pressure was thus less than 30 psig. The product had a viscosity at 190° C. of 2,150 cP and an acid number of 20. This is a 43.8 percent conversion of maleic anhydride.

Example 3

A 100 melt flow rate crystalline polypropylene, available as Tenite P9-018 from Eastman, was fed to a 43 L/D 25 mm co-rotating twin-screw extruder (see FIG. 1) at the rate of 10 pounds/hour. Ditertiary butyl peroxide was fed into zones 2, 4, 5, and 6 at the rates of 0.25, 3.0, 2.5 and 2.5 pph relative to polymer feed respectively. Molten maleic anhydride was fed into zone 3 at the rate of 20 pph. Temperature of zone 1 was 240° C. while zones 2, 7 and 8 were 220° C. All other zones were at 210° C. The screw speed was set at 300 rpm and the back pressure control valve was set at 125 psi. The product at these conditions had a 69.7 acid number and a viscosity at 190° C. of 843 cP. This is an 82.4 percent conversion of maleic anhydride.

Example 4

The conditions of example 3 were used except the maleic anhydride feed rate was increased to 25 pph and the peroxide feeds in zone 2, 4, 5, and 6 were 0.25, 3.25, 3.75 and 3.5 pph respectively. The back pressure control valve maintained a pressure of 125 psi. The product had a 78.4 acid number and a viscosity at 190° C. of 1,620 cP. The maleic anhydride conversion was 76.9 percent.

Comparative Example 5

The identical conditions as in example 4 were used but the back pressure control valve at the die end of the extruder was removed and the back pressure was thus less than 30 psig. Without the back pressure control valve the product had a viscosity of 2,300 cPs at 190° C. and an acid number of only 42.1. This is only a 41.3 percent conversion of maleic anhydride.

Example 6

An ethylene propylene random copolymer, available from Eastman as Tenite P5-006, containing 2.3 percent ethylene and having a melt flow rate of 7g/10 minutes was maleated at 220° C. on a 43 L/D 25 mm twin-screw extruder at 10 lbs/hr and 250 rpms. The zone 1 temperature was 250, zone 2 temperature was 240° C. and zone 3 temperature 230° C. The remaining 5 zones were set to 220° C. Maleic anhydride was fed to zone 3 at a rate of 20 pph. Ditertiary butyl peroxide was fed to zones 2, 4, 5, and 6 at rates of 0.25, 3.0, 3.0 and 3.0 pph. The product had a 60.6 acid number and a 1,418 cP at 190° C. viscosity. The ring and ball softening point was 150° C. This is a 71.7 percent conversion of maleic anhydride.

Example 7

A random ethylene propylene copolymer containing 5.5 percent ethylene and having a melt flow rate of 0.5, available as Tenite P5-001 from Eastman, was maleated to 45.7 acid number, on a 43 L/D 25 mm twin-screw extruder (see FIG. 1). Barrel zone 1 temperature was 250° C., zone 2 was 240° C., zone 3 was 230° C. and zones 4, 5, and 6 were 200° C. Zones 7, 8, and 9 temperatures were 220° C. Copolymer was fed at 10 pounds/hour and maleic anhydride was fed at 11 pph into zone 3. Di-t-butyl peroxide was feed into zones 2, 4, 5 and 6 at 0.25, 2.3, 2.3 and 2.3 pph respectively. The screw speed was 200 rpm and the back pressure control valve was set at 150 psi. The product viscosity was 1,520 cP and ring and ball softening point was 139° C. This is a 93.0 percent conversion of maleic anhydride.

Comparative Example 8

The identical conditions of example 7 were used except the back pressure control valve was replaced with a traditional die and the back pressure was thus less than 30 psig. At the same temperature and feed rates as in example 7 the product made at less than 30 psi back pressure had a viscosity of 2,065 cP at 190° C. and an acid number of 27.8. This is only a 56.6 percent conversion of maleic anhydride.

Example 9

A random ethylene propylene copolymer containing 3.2 percent ethylene, available from Eastman as Tenite P5-011, was maleated at the rate of 10 pounds/hr at 250 rpm and 150 psi back pressure on a 43 L/D 25 mm twinscrew extruder (see FIG. 1). The temperature of zone 1 was 250° C., zone 2 was 240° C., and zone 3 was 230° C. Zones 4, 5, and 6 temperatures were 200° C. while zones 7, 8, and 9 temperatures were 220° C. Maleic anhydride was fed to zone 3 at the rate of 11 pph. Di-T-butyl peroxide was fed to zones 2, 4, 5, and 6 at the rate of 0.25, 1.6, 1.6 and 1.6 pph respectively. The product had an acid number of 41.4, a viscosity of 1,073 cP at 190° C. and a ring and ball softening point of 143° C. The maleic anhydride conversion was 89.8 percent.

Comparative Example 10

The identical conditions of example 9 were used except the back pressure control valve was replaced with a traditional die and the back pressure was thus less than 30 psig. At the same temperature and feed rates as in example 9 the product made at less than 25 psi back pressure had a viscosity of 1,578 cP at 190° C. and an acid number of 24.8. This is only a 50.5 percent conversion of maleic anhydride.

We claim:

1. A process for the production of low molecular weight grafted polyolefins comprising:

(a) mixing, at an elevated temperature of about 160 to 300° C. in an extruder equipped with an outlet pressure control device about 0.1 to 20 weight percent of a free radical initiator, about 0.1 to 30 weight percent of an ethylenically unsaturated polycarboxylic acid, anhydride, or ester thereof, and the remainder of a polyolefin containing at least 93 weight percent C3–C10 olefins, wherein said elevated temperature is higher than the atmospheric boiling point of at least one of the components thereby producing an elevated pressure in said extruder of at least 30 psig; and (b) extruding the resulting molten grafted polyolefin having a viscosity of less than 3,000 cP at 190° C., wherein said grafted polyolefin is grafted with maleic anhydride to greater than 5 weight percent to an acid number greater than 28.

* * * * *